US011429716B2

(12) United States Patent
Hebert et al.

(10) Patent No.: US 11,429,716 B2
(45) Date of Patent: Aug. 30, 2022

(54) COLLABORATIVE APPLICATION SECURITY

(71) Applicant: SAP SE, Walldorf (DE)

(72) Inventors: Cedric Hebert, Mouans Sartoux (FR); Merve Sahin, Antibes (FR); Anderson Santana de Oliveira, Antibes (FR)

(73) Assignee: SAP SE, Walldorf (DE)

( * ) Notice: Subject to any disclaimer, the term of this patent is extended or adjusted under 35 U.S.C. 154(b) by 314 days.

(21) Appl. No.: 16/696,594

(22) Filed: Nov. 26, 2019

(65) Prior Publication Data
US 2021/0157917 A1    May 27, 2021

(51) Int. Cl.
| | | |
|---|---|---|
| *G06F 21/55* | (2013.01) | |
| *G06F 21/53* | (2013.01) | |
| *G06F 21/56* | (2013.01) | |
| *G06F 8/65*  | (2018.01) | |
| *G06F 21/54* | (2013.01) | |

(52) U.S. Cl.
CPC .............. *G06F 21/554* (2013.01); *G06F 8/65* (2013.01); *G06F 21/53* (2013.01); *G06F 21/54* (2013.01); *G06F 21/566* (2013.01); *G06F 2221/033* (2013.01)

(58) Field of Classification Search
CPC ........ G06F 21/554; G06F 21/55; G06F 21/53; G06F 21/552; G06F 21/577; G06F 21/57; G06F 2221/033
See application file for complete search history.

(56) References Cited

U.S. PATENT DOCUMENTS

| | | | | |
|---|---|---|---|---|
| 8,522,347 B2 * | 8/2013 | Yanovsky | ............... | H04L 51/04 709/206 |
| 8,584,089 B2 * | 11/2013 | Kanno | ................ | G06F 11/3668 717/124 |
| 8,667,588 B2 * | 3/2014 | Stolfo | ................. | H04L 63/1408 726/23 |
| 8,881,278 B2 * | 11/2014 | Kaplan | ................... | G06F 21/56 726/23 |
| 9,785,425 B2 * | 10/2017 | Dabbiere | .............. | H04L 63/108 |
| 10,063,571 B2 * | 8/2018 | Be'ery | ................ | H04L 63/1491 |
| 10,375,576 B1 * | 8/2019 | Wu | ........................ | G06F 21/566 |
| 10,769,275 B2 * | 9/2020 | Licata | ..................... | G06F 21/71 |
| 10,810,304 B2 * | 10/2020 | Gupta | ..................... | G06F 9/445 |
| 10,887,333 B1 * | 1/2021 | Pereira | ................ | H04L 63/0263 |
| 10,986,127 B1 * | 4/2021 | Sellers | .................... | H04L 63/20 |

(Continued)

OTHER PUBLICATIONS

Sanchez-Rola et al., "Clock Around the Clock: Time-Based Device Fingerprinting", Oct. 2018, ACM SIGSAC Conference, 13 pgs.

(Continued)

*Primary Examiner* — Zachary A. Davis
(74) *Attorney, Agent, or Firm* — Klarquist Sparkman, LLP

(57) ABSTRACT

Systems, methods, and computer media for collaboratively securing software applications are provided herein. Through a collaborative approach, the described examples allow detection and management of unauthorized users across applications and application suites. By communicating details regarding cyber-attacks among applications, threats to applications can be managed pre-emptively. For example, applications can use attacks on other applications to implement new honeytokens, threat detection points, and blacklisted usernames or other identifiers to limit data access in future attacks.

19 Claims, 7 Drawing Sheets

(56) References Cited

U.S. PATENT DOCUMENTS

| | | | |
|---|---|---|---|
| 2006/0161982 A1* | 7/2006 | Chari | G06F 21/53 |
| | | | 726/23 |
| 2008/0256172 A1 | 10/2008 | Hebert et al. | |
| 2009/0077376 A1 | 3/2009 | Montagut et al. | |
| 2009/0222399 A1 | 9/2009 | Gomez et al. | |
| 2009/0327317 A1 | 12/2009 | Ulmer et al. | |
| 2012/0042364 A1 | 2/2012 | Hebert | |
| 2013/0160079 A1 | 6/2013 | Hebert | |
| 2013/0262397 A1 | 10/2013 | Hebert | |
| 2014/0372927 A1 | 12/2014 | Hebert et al. | |
| 2015/0033346 A1 | 1/2015 | Hebert et al. | |
| 2016/0078234 A1 | 3/2016 | Li et al. | |
| 2016/0099953 A1 | 4/2016 | Hebert et al. | |
| 2016/0112376 A1 | 4/2016 | Gomez et al. | |
| 2017/0019421 A1 | 1/2017 | Hebert et al. | |
| 2017/0169217 A1 | 6/2017 | Rahaman et al. | |
| 2017/0177308 A1 | 6/2017 | Montagnon et al. | |
| 2017/0177310 A1 | 6/2017 | Mathias et al. | |
| 2018/0004978 A1 | 1/2018 | Hebert et al. | |
| 2018/0041546 A1 | 2/2018 | Gomez et al. | |
| 2018/0077174 A1 | 3/2018 | Hebert | |
| 2019/0068641 A1* | 2/2019 | Araujo | G06F 21/54 |

OTHER PUBLICATIONS

"Observations From the Front Lines of Threat Hunting: A 2018 Mid-Year Review From Falcon OverWatch", https://go.crowdstrike.com/rs/281-OBQ-266/images/Report2018OverwatchReport.pdf, 20 pgs.

"The RASP market size is expected to grow from USD 294.7 million in 2017 to USD 1, 240.1 million by 2022, at a Compound Annual Growth Rate (CAGR) of 33.3%", https://www.prnewswire.com/news-releases/the-rasp-market-size-is-expected-to-grow-from-usd-2947-million-in-2017-to-usd-12401-million-by-2022-at-a-compound-annual-growth-rate-cagr-of-333-300578893.html, Jan. 8, 2018, 4 pgs.

Canarytokens by Thinkst, https://canarytokens.org/generate, accessed Aug. 13, 2019, 1 pg.

AppSensor DetectionPoints, https://www.owasp.org/index.php/AppSensor_DetectionPoints, accessed Aug. 13, 2019, 38 pgs.

* cited by examiner

COLLABORATIVE APPLICATION SECURITY

BACKGROUND

Securing computer systems and applications against attackers employing varying malicious techniques has become a difficult task. In addition to exploiting software vulnerabilities, some attackers obtain valid credentials for authorized users and use these credentials to gain unauthorized access to applications or computer systems. Detecting and managing such unauthorized access is challenging. Additionally, many attackers work in teams and target multiple applications or computing resources to which authorized users have access.

DETAILED DESCRIPTION

Figure 1:
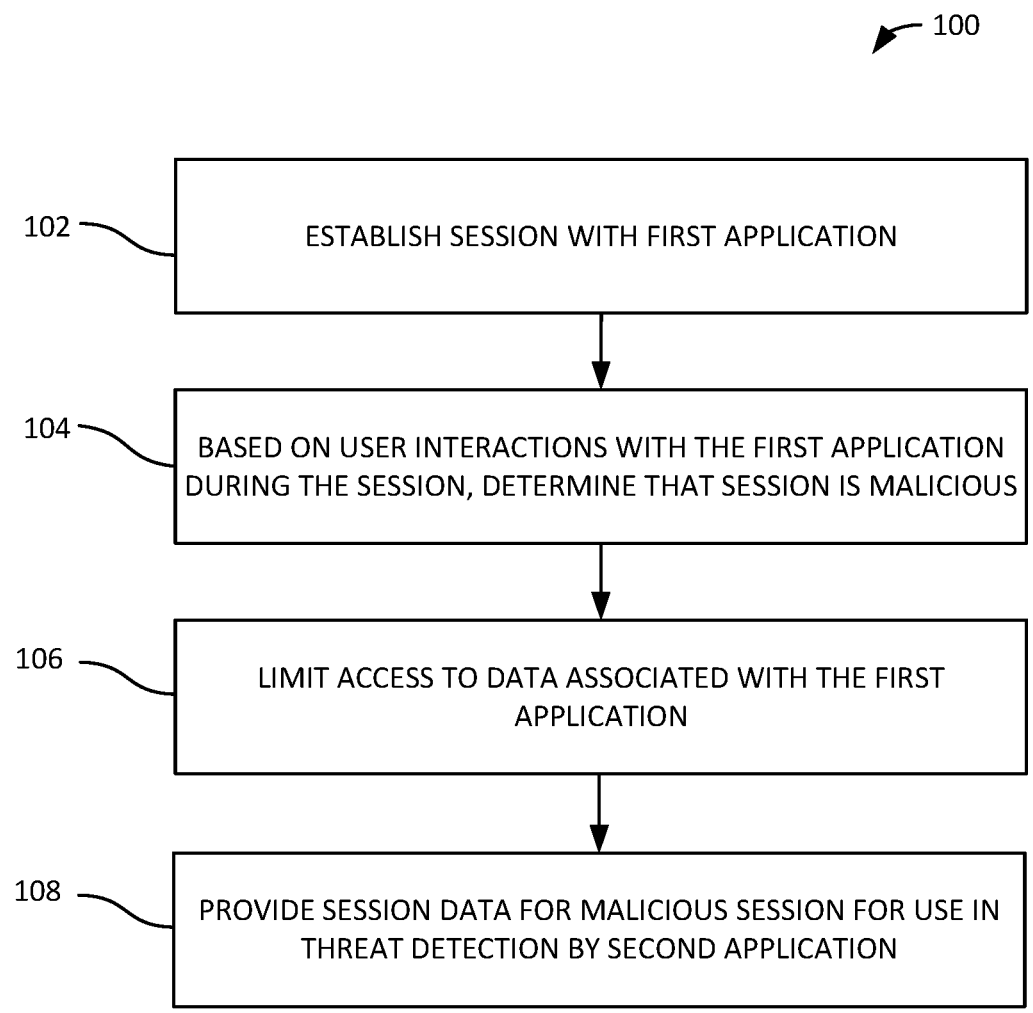
FIG. 1 illustrates an example method of collaboratively securing an application.

The examples described herein collaboratively secure software applications against unauthorized access. Application security is typically dealt with at the application level. Through a collaborative approach, the described examples allow detection and management of unauthorized users across applications such that, for example, a threat detected in one application can be pre-emptively managed in a different application.

As an example, during an application session, activity can indicate that the session is likely to be malicious even when valid account credentials have been provided. A user might, for example, look for hidden functions, attempt to modify a session cookie to become an administrator, or take other actions that are unusual for a typical user, indicating a possibly malicious or unauthorized session. Action can be taken to limit further access and secure the application against future incursions by that user. For example, the user can be transferred to a cloned application session that includes fabricated data to stop the present incursion without alerting the attacker that the attack has been detected. The session can also be terminated.

Session data for the malicious session can by used by another application for threat detection. For example, attackers often try to access multiple different applications using stolen credentials in hopes that the user has used the same username and password for each application. Once it has been determined that credentials have been compromised and were used to gain unauthorized access to one application, the credentials and/or a digital fingerprint representing the attacker and the attacker's computing device can be provided to other applications as blacklisted credentials or fingerprints for which sessions will be denied or for which cloned sessions will be established to avoid alerting the attacker while still limiting access to actual data.

In addition to credentials or a digital fingerprint, information related to the attacker's behavior in the malicious sessions can be provided to other applications. For example, if a session with a first application is determined to be malicious because the attacker triggered a honeytoken or detection point (e.g., attempting to access administrator functionality), another application can add a similar honeytoken or detection point to help identify attacks. For applications in which malicious users are transferred to a cloned application session, the attacker's activity while in the clone can be provided to other applications. In some examples, session data and clone activity are also provided to a threat intelligence agent for review.

Session information can be shared among applications through a number of approaches, including a centralized shared threat data store (such as a database) accessible to the different applications. In some examples, a decentralized approach (such as a blockchain-based approach) is used in which each application updates its own ledger copy of threat information.

The described collaborative approaches to securing applications allow applications to share information and preemptively address threats. Examples are described below with reference to FIGS. 1-7.

FIG. 1 illustrates a method 100 of collaboratively securing applications. In process block 102, a session is established with a first application. The application can be a local application executing on a user's computing device, or the session can be a web application executing on one or more remote computing devices that interacts with a browser executing on a user's computing device. Based on one or more user interactions with the first application during the session, it is determined that the session is malicious in process block 104. For example, a user can trigger a honeytoken or a threat detection point.

As used herein, a "honeytoken" is an aspect added to an application that, when interacted with, indicates a malicious session. Honeytokens can also be referred to as, for example, deceptive elements, bread crumbs, *canaries*, or canary tokens. Honeytokens can be files, folders, URLs, options, usernames/passwords (e.g., admin/admin), old passwords, blacklisted credentials, or other items that are specifically added to an application so that if an attacker interacts with the honeytoken, the attack can be discovered. "Threat detection points" as used herein are similar to honeytokens but refer to existing aspects of an application with which interaction indicates a malicious session. Threat detection points can also be referred to as "tripwires," and can also be detection rules used in intrusion detection systems.

Responsive to determining that the session is malicious, in process block 106 access to data associated with the first application is limited. In some examples, the session is terminated. In other examples, a cloned application session is generated, and the malicious session is transferred to the cloned application session. The cloned application session includes at least some alternative data in place of data associated with the malicious session. In some examples, actual data the attacker has already accessed prior to attack detection is provided in the cloned session but other data is "fake" or alternative data provided to appear to the attacker like actual data. A limited amount of actual data can be provided if the attacker has already gained access to avoid changing the data displayed and alerting the attacker that the attack has been discovered. The fake data can be generated by analyzing the categories, format, data types, etc. of actual data and dynamically generating fake data or retrieving fake data from an alternative data store. In this way, the cloned application session has the interface and appearance of the real application, but some or all of the data accessed through the clone is fake data. Because the attacker is unaware that the attack has been detected, the attacker's techniques and targets can be learned.

In process block 108, session data for the malicious session is provided for use in threat detection by a second application. The session data for the malicious session can include credentials (e.g., username and/or password) used to establish the malicious session or a digital fingerprint reflecting characteristics of the malicious session.

A digital fingerprint (sometimes referred to as a browser fingerprint or device fingerprint) represents a client computer and/or associated user. Some digital fingerprints (e.g., FingerprintJS 2 and WebGL) are determined by sending a browser a portion of code (e.g.,JavaScript®) to run and the result becomes the digital fingerprint. The result of running the code will vary depending on the browser settings, system settings, fonts, plugins, screen resolution, and/or other aspects of the client computer that results in a unique identifier representing the client computer. Hardware information for the computer (number of processors, screen resolution, etc.), location information (IP address, time zone, country, language settings), session identifiers such as session cookies, and user information (username) can also be used determine a fingerprint.

Some digital fingerprinting approaches (e.g. Canvas) involve providing an image to a browser for rendering, and the result is sufficiently different from machine to machine that the result can be used as an identifier. Another digital fingerprinting approach that can be used is CryptoFP, where different challenges are provided to the browser, and the differing times the challenges take to complete for each machine is used as the identifier.

Session data for the malicious session can also include triggered honeytokens or threat detection points that caused the malicious session to be identified as well as indications of activities performed in the application or while the attacker is in the cloned application session. In some examples, session data are provided when a session is determined to be malicious, and if the attacker is transferred to a cloned application session, periodic updates reflecting activity in the clone are provided.

In some examples, for the first and second applications, credentials or a digital fingerprint associated with the malicious session are blacklisted such that future session requests for the first or second applications that match the credentials or the digital fingerprint are denied or established as cloned application sessions.

The second application can use the provided session data for threat detection. For example, the second application can create at least one of a threat detection point or a honeytoken based on the indication of the one or more user interactions with the application. By knowing what user interactions caused the session with the first application to be found to be malicious (e.g., a triggered honeytoken), the second application can create a honeytoken to monitor for similar behavior. This provides another layer of security beyond blacklisting the credentials or fingerprint of the attacker, because if another attacker with whom the original attacker is coordinating, or the same attacker with different credentials, gains access to the second application despite the blacklisted credentials, the newly created honeytoken will be triggered if the corresponding action is again part of an attack.

The provided session data can be added to a shared threat data store accessible to the first and second (and other) applications. The first and second applications can be part of a suite of related applications (such as spreadsheet, word processing, presentation applications or a suite of workflow or management applications). In some examples, applications from different vendors and companies can share threat data, redacting certain information to ensure private data is not shared or security further compromised. In some examples, different applications are implemented as a collection of microservices, and the microservices share threat data.

In some examples, threat updates are pushed to subscribing applications from the shared threat data store, either when new information is provided from one of the applications or periodically (e.g., hourly or daily). A decentralized approach (e.g., a blockchain-based approach) can also be used to manage threat data in which each application updates a ledger copy, as described in more detail with respect to FIG. 4.

Figure 2:
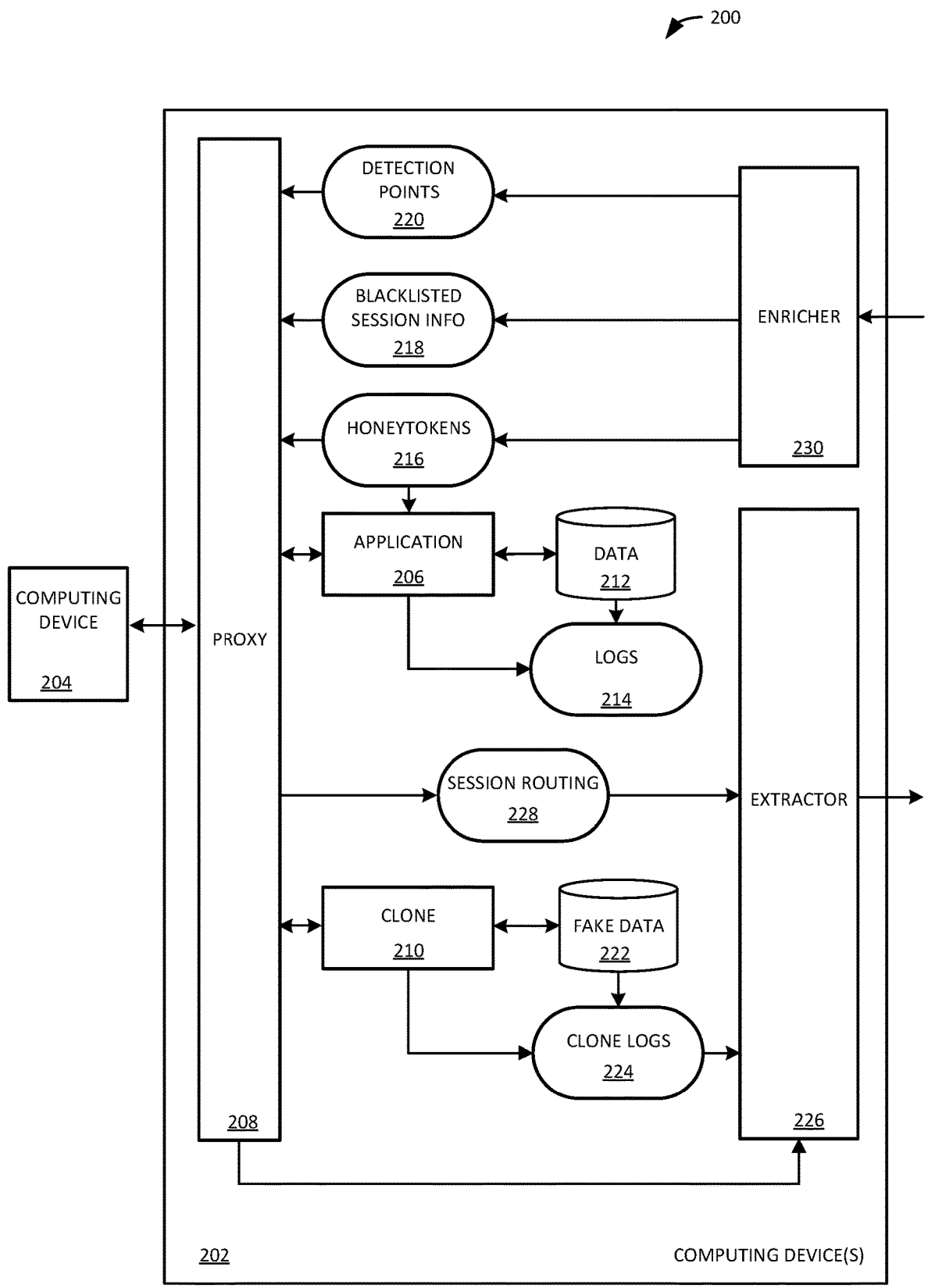
FIG. 2 illustrates an example application-level portion of a collaborative application security system.
Figure 3:
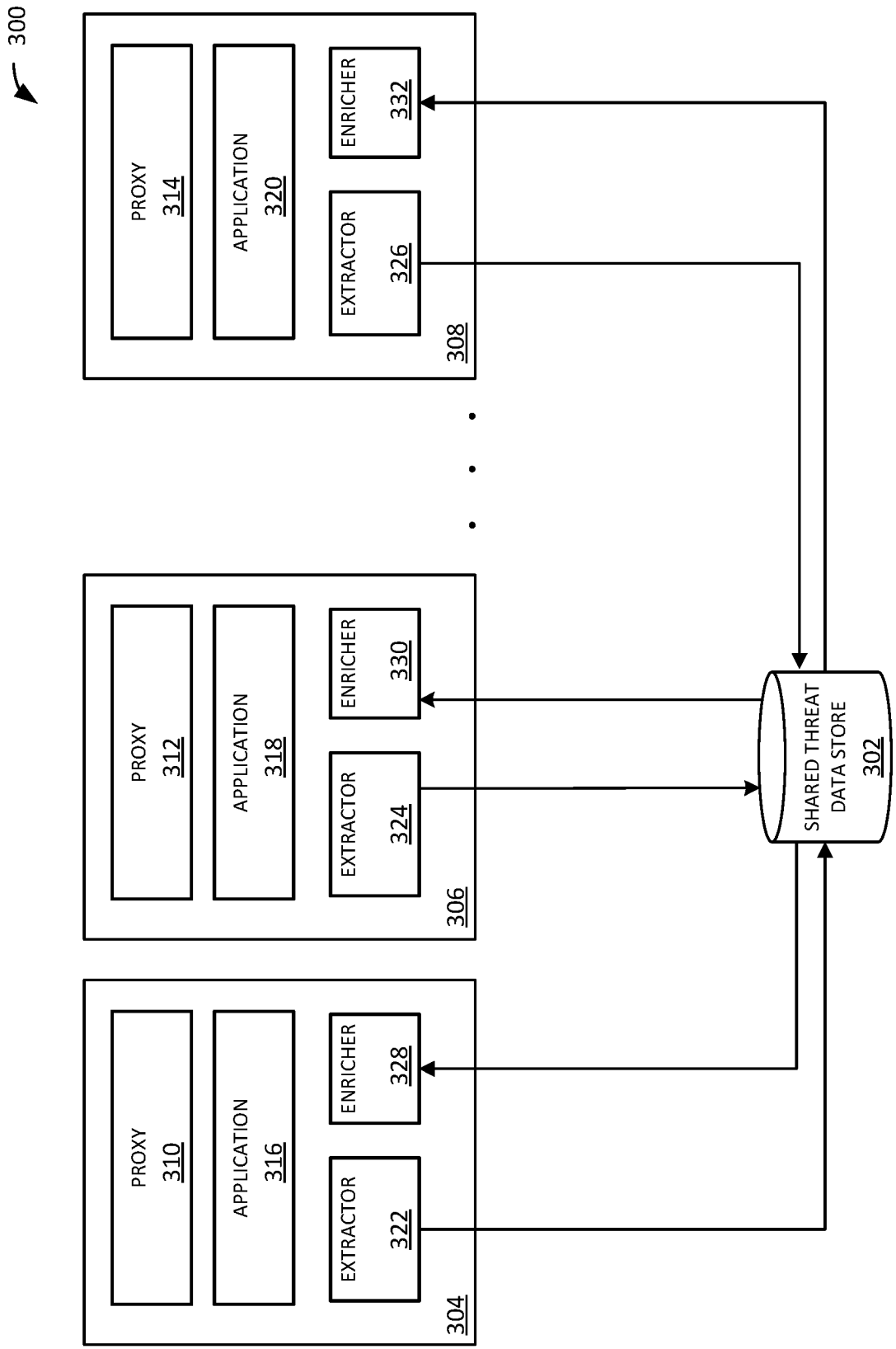
FIG. 3 illustrates an example collaborative application security system in which multiple applications access and inform a shared threat data store.
Figure 4:
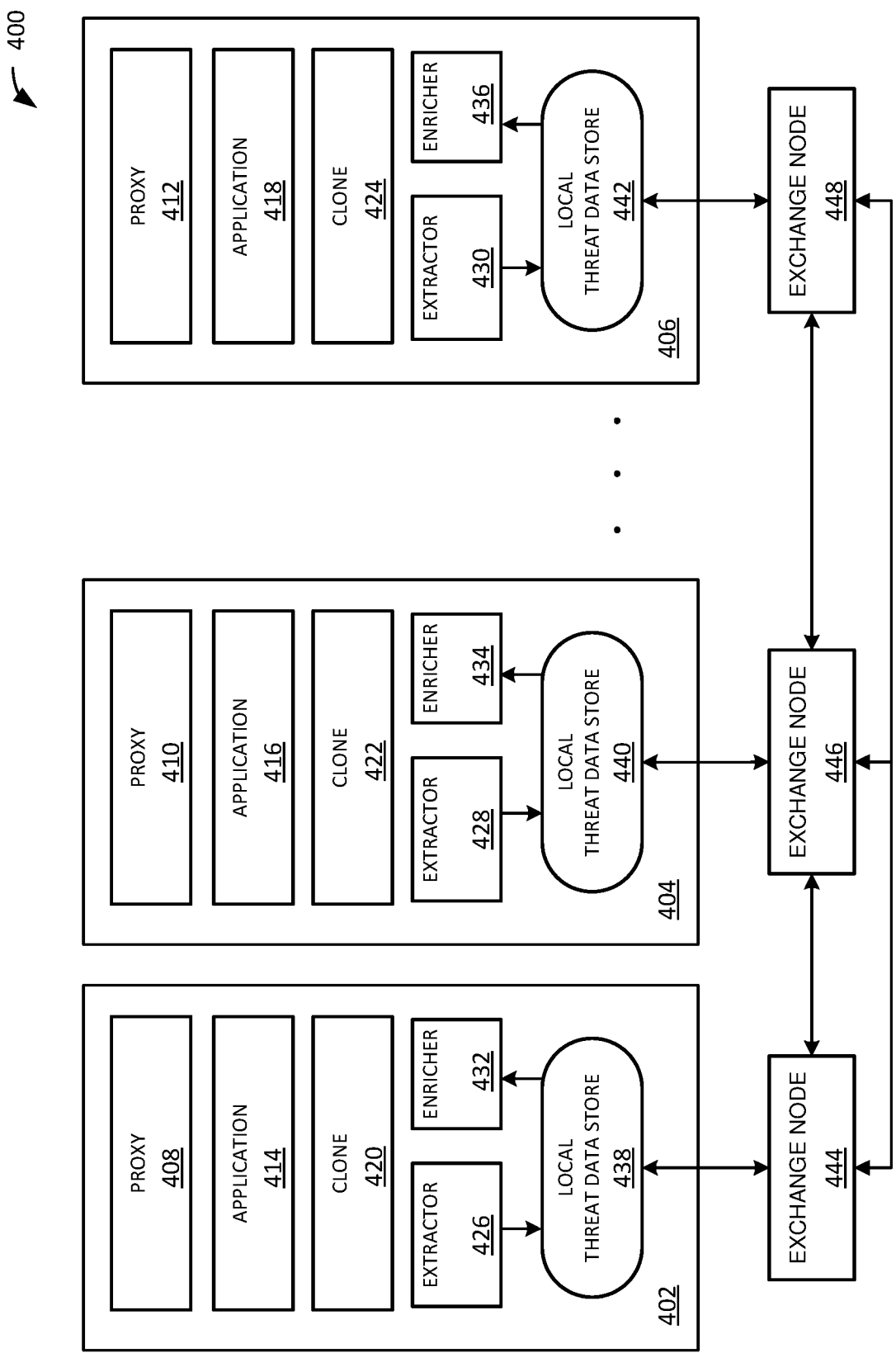
FIG. 4 illustrates an example collaborative application security system in which applications maintain local threat data stores that are updated when malicious sessions are detected.

FIG. 2 illustrates a system 200 implemented on one or more computing device(s) 202. Computing device 204 (e.g., a client computing device executing a browser) submits a request for a session with application 206. System 200 illustrates example components associated with a single application that provide session data for malicious sessions for use by other applications and receive threat data from other applications. Multiple applications are illustrated in FIGS. 3-4.

The session request sent by computing device 204 is intercepted by reverse proxy 208, which acts as an intermediary and allows some sessions to be established with application clone 210 instead of application 206. (The terms proxy and reverse proxy are used interchangeably herein.) Once the application session has been authenticated, a user associated with computing device 204 can access data in data store 212 through application 206. Application logs 214 record operations performed in the application session. In some examples, application 206 has access to honeytokens 216, blacklisted session information 218, and threat detection points 220. When a honeytoken in honeytokens 216 or a threat detection point in threat detection points 220 is triggered (e.g., by a user attempting to gain access to a particular URL, modify a session cookie, receiving a "403 forbidden" message, etc.), proxy 208 (or application 206) determines that the session is malicious. Blacklisted session information 218 can include usernames, passwords, digital fingerprints, and other information associated with sessions with application 206, or other applications, previously found to be malicious.

Application clone 210 then establishes a cloned application session and the application session is transferred to the cloned application session. In some examples, application clone 210 is omitted, and sessions are terminated when found to be malicious. While in the cloned application session, the user associated with computing device 204 has access to fake data in fake data store 222 instead of the data in data store 212. Clone logs 224 record user interactions with the clone 210 in the cloned application session.

When a session is determined to be malicious, an extractor 226 captures various information that can be used to protect other applications. The information can include session routing data 228, from which extractor 226 can determine which threat detection point or honeytoken triggered the determination of a malicious session. Session routing data 228 can also include username and digital fingerprint. Extractor 226 can also provide clone logs 224, which includes records of what data in fake data store 222 were accessed in the cloned application session. For example, if, while in the cloned application session, the attacker uploads or tries to upload a file to a certain file path, that file path can be monitored and used as a new threat detection point. Application logs 214 for application 206 can also be used. For example, interactions with application 206 prior to the determination of maliciousness can be accessed and evaluated. In some examples, such information is routed to a threat detection agent for later analysis. Data captured by extractor 226 can be communicated to other connected applications (illustrated in FIGS. 3 and 4).

Enricher 230 provides information captured by extractors associated with other applications. For example, enricher 230 can provide new threat detection points to threat detection points 220, new blacklisted session information to blacklisted session information 218, or new honeytokens to honeytokens 216. Application 206 can access this information to enhance security and limit unauthorized access to the data in data store 212.

FIG. 3 illustrates an example system 300 in which multiple application systems are collaboratively secured using shared threat data store 302. Application systems 304, 306, and 308 are similar to system 200 of FIG. 2 (with application clones omitted). Application systems 304, 306, and 308 include, respectively, reverse proxies 310, 312, and 314, applications 316, 318, and 320, extractors 322, 324, and 326, and enrichers 328, 330, and 332. Session data captured by extractors 322, 324, and 326 is provided to shared threat data store 302. Similarly, threat updates are provided from shared threat data store 302 to enrichers 328, 330, and 332 for use with applications 316, 318, and 320. Extractors 322, 324, and 326 can provide session data when malicious sessions are detected, or shared threat data store 302 (or an associated agent) can pull session data periodically. Enrichers 328, 330, and 332 can receive threat updates as shared threat data store 302 is updated or shared threat data store 302 (or an associated agent) can push threat updates periodically.

In some examples, threat updates are based at least in part on the features and capabilities of the associated applications so that respective applications receive honeytokens and threat detection points that correspond to the application's functionality.

FIG. 4 illustrates an example system 400 in which multiple application systems are collaboratively secured in a decentralized manner. Application systems 402, 404, and 406 are similar to system 200 of FIG. 2. Application systems 402, 404, and 406 include, respectively, reverse proxies 408, 410, and 412, applications 414, 416, and 418, application clones 420, 422, and 424, extractors 426, 428, and 430, and enrichers 432, 434, and 436. In system 400, application systems 402, 404, and 406 also include local threat data stores 438, 440, and 442. Local threat data stores 438, 440, and 442 can be ledger copies in a blockchain-based architecture or be part of another peer-to-peer, decentralized communication mechanism. Enrichers 432, 434, and 436 can continuously monitor the corresponding local threat data store (e.g., ledger copy), and when new information appears, honeytokens or threat detection points can be added or blacklisted session information can be added. Local threat data stores 438, 440, and 442 are updated through exchange nodes 444, 446, and 448.

Figure 5:
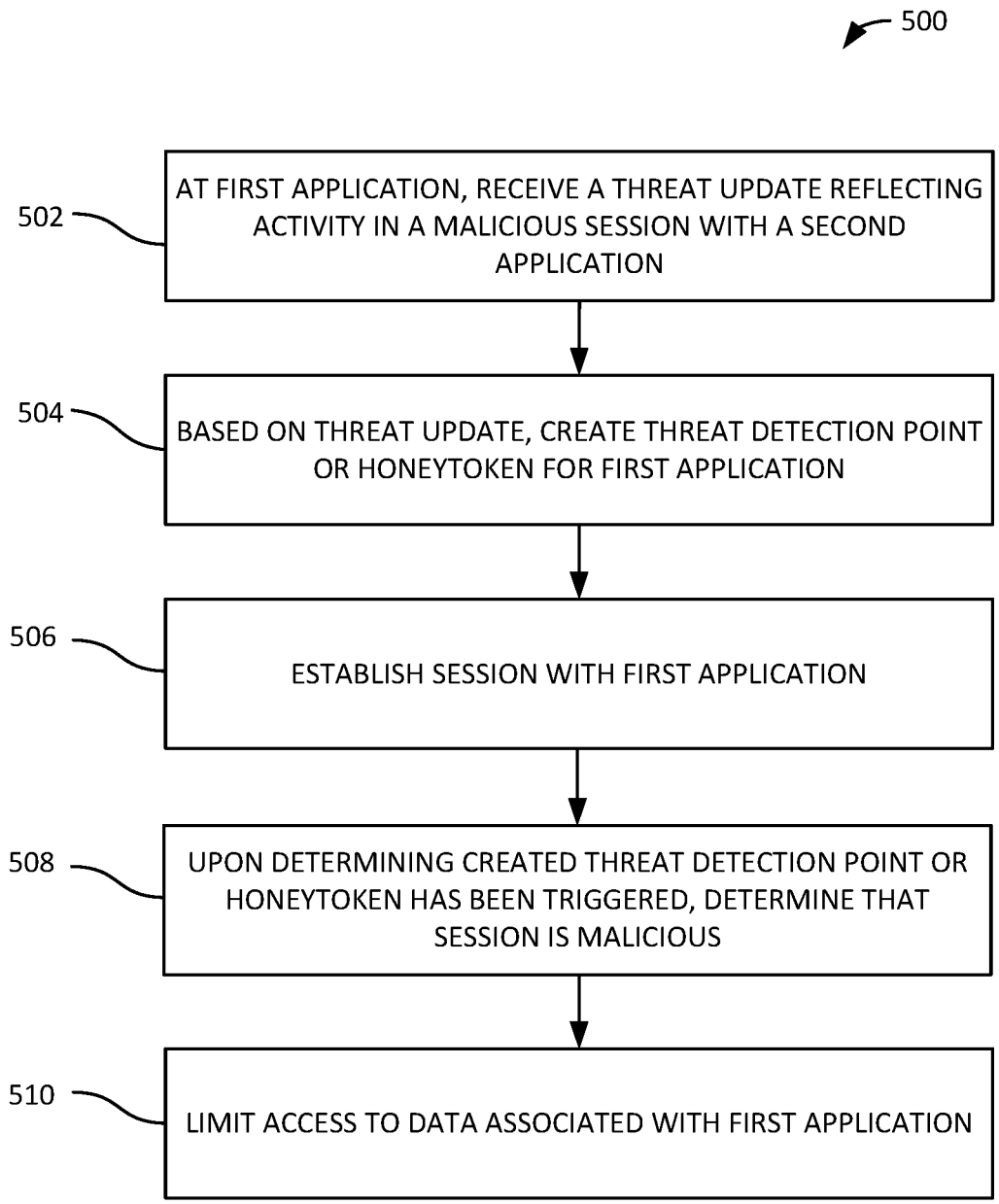
FIG. 5 illustrates an example method of collaboratively securing an application in which a threat update reflecting malicious activity in one application is used by another application to create a threat detection point or honeytoken.

FIG. 5 illustrates a method 500 of collaboratively securing an application. In process block 502, at a first application, a threat update is received reflecting activity in a malicious session with a second application. Based on the threat update, at least one of a threat detection point or a honeytoken are created for the first application in process block 504. A threat detection point is an existing aspect of the first application that, when interacted with, indicates a malicious session. A honeytoken is an aspect added to the first application based on the threat update that, when interacted with, indicates a malicious session. In process block 506, a session is established with the first application. Upon determining that a threat detection point or honeytoken created based on the threat update has been triggered, it is determined that the session with the first application is malicious in process block 508. Access to data associated with the first application is limited in process block 510. Access can be limited, for example, by transferring the session with the first application to a cloned application session.

Figure 6:
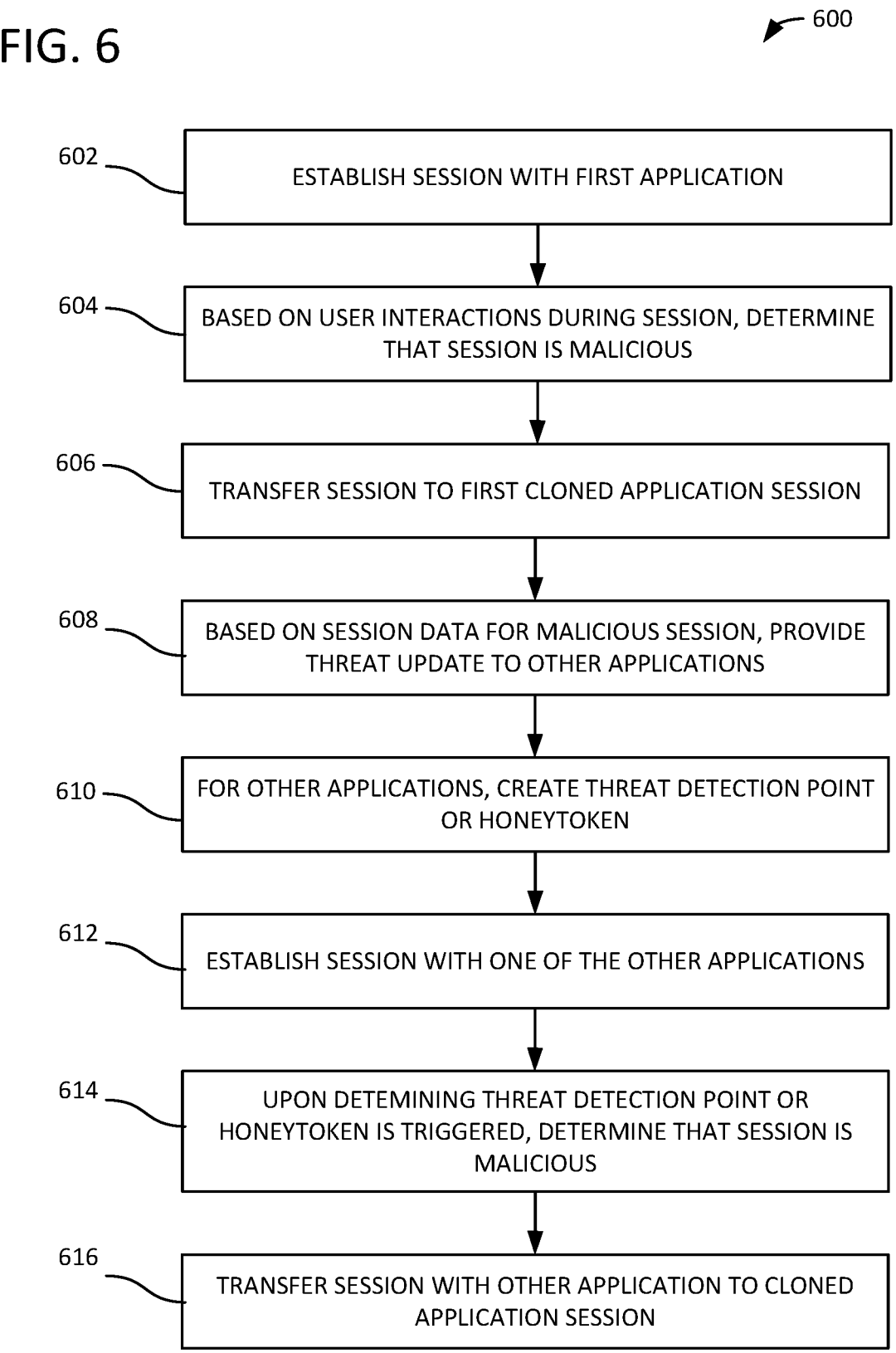
FIG. 6 illustrates an example method of collaboratively securing an application in which malicious sessions are transferred to cloned application sessions.

FIG. 6 illustrates a method 600 of method of collaboratively securing an application in which malicious sessions are transferred to cloned application sessions. In process block 602, a session is established with a first application. In process block 604, based on one or more user interactions with the first application during the session, it is determined that the session is malicious. For example, a honeytoken or threat detection point can be triggered. In process block 606, the session with the first application is transferred to a first cloned application session. The first cloned application session includes at least some alternative data in place of data associated with the session with the first application.

In process block 608, a threat update is provided to a plurality of other applications based on session data for the malicious session. For the respective other applications, at least one of a threat detection point or a honeytoken are created in process block 610. In process block 612, a session is established with one of the other applications. Upon determining that a threat detection point or honeytoken created based on the threat update has been triggered, it is determined in process block 614 that the session with the one of the other applications is malicious. The session with the one of the other applications is transferred to a second cloned application session in process block 616.

Various specific examples illustrating the operation of the systems and methods described with reference to FIGS. 1-7 are now provided. For these examples, "application one" is a web application where "Bob" has a user account. Application one computes and stores a fingerprint for connected users and is protected with a honeytoken in the form of a cookie that contains the value "is_admin=false." Application one is also protected with a threat detection point: visiting the URL "applicationone.com/phpMyAdmin" will be considered as an attack. Application one has a database which contains a table named "Users," and which contains user accounts, in the form of a username and of a password hash. Application one also contains a list of files on its hosting server, including a folder named "/tmp" where no file is supposed to be stored. "Alice" is an attacker who stole Bob's credentials, for example via a phishing attack.

Specific example 1: cookie tampering. Alice connects as Bob. Alice is assigned the cookie "is_admin=false." She changes this cookie to "is_admin=true," hoping to be granted administrative privileges. This is detected by the application and shared to all other applications. Applications that do not have an "is_admin" cookie can now immediately deploy one, so that if Alice or another attacker working with Alice attacks these other applications in the same way, the applications will detect it and transfer the attacker to their corresponding application clone.

Specific example 2: phpMyAdmin. Alice connects as Bob. She is assigned the cookie "is_admin=false," but she ignores it. Alice tries to elevate privileges by searching for a hidden admin panel. In doing so, she visits "application-one.com/phpmyadmin." This is detected by the application and shared to all other applications. Applications that do not have a "/phpMyAdmin" page can now immediately start monitoring calls to this URL, so that if Alice attacks these other applications in the same way, they will detect it and transfer Alice to their corresponding application clone.

Specific example 3: database breach. Alice connects as Bob. She ignores the cookie and finds a zero-day attack in the form of an SQL Injection. Through this attack, she enumerates the database of applicationone.com and starts downloading content. While doing so, she downloads the "Users" table, which will be detected and shared. Applications can now immediately deploy a credential honeytoken for the user/password hash combinations that are not already a valid user in their database, in addition to sending password reset warnings to all real users. If Alice cracks some of the password hashes, and then tries to login to another application as one of these users, this will be detected, allowing for immediate transfer to the respective application clone. In some examples, applications may belong to different entities or companies. The data shared can be limited to preserve privacy and for security reasons.

Specific example 4: clone information. Alice connects as Bob. She is detected by application one and sent to application one's clone. Thinking she is still in the real application, Alice uploads malware to the clone. Because traffic related to the clone is malicious, this file creation is detected as an attack and the information is sent to all other applications, e.g. creation of file "webShell.php" to the folder "/var/www/." Applications can now deploy a rule preventing a similar file to be written, and upon write attempt, re-direct the attacker to the respective application clone.

Specific example 5: fingerprint blacklist. When Alice's activity is detected as malicious, the fingerprint of her session is sent to the other applications. This fingerprint can include the username used for the attack, as well as information about the web browser/operating system and/or hardware details of the attacker. Applications can now detect this attacker attempting to connect as Bob. The real Bob will have a different fingerprint, letting him access "application two" and "application three" normally, while Alice will be detected as the attacker of application one and be sent to an application clone upon successful login to application two or application three (or denied a session).

Specific example 6—Alice attacking application one. Alice connects as Bob to application one. She tries to exploit the application and succeeds after having been detected. She then uses her knowledge to try to hack applications two and three. The knowledge gathered while she attacked application one is used to protect applications two and three. Without this knowledge, Alice's attacks on applications two and three could have been successful as she may not repeat in applications two and three the mistakes she made while attacking application one.

For this example, applications one, two, and three are all services that share a file upload feature for letting a user update his or her profile picture. All three applications are already protected with a "is_admin" honeytoken cookie. It is also assumed that non-clone applications do not log POST content for security and privacy reasons.

Alice connects with Bob's credentials. At this point, it is not known that Alice is impersonating Bob.

```
POST /login
    username=bob&password=abc123
```

Application one then replies by establishing a session (SID=123456). It adds a "is_admin=false" honeytoken and renders the home HTML page. This page contains some javascript code which will require the user to provide a fingerprint.

```
(application one)
HTTP/1.1 200
Set-Cookie: SID=123456
Set-Cookie: is_admin=false
<html><script>function compute_fingerprint( )</script></html>
```

Alice's browser executes the code and sends the fingerprint:

```
POST /api/fingerprint
    Cookie: SID=123456;is_admin=false
    {"fingerprint":"89wer89023r89"}
```

The server stores the fingerprint.
(application one)
HTTP/1.1 200
Alice now displays the profile page of Bob.

```
GET /myProfile
    Cookie: SID=123456;is_admin=false
```

This is a legitimate action, so the application replies with the corresponding data.

```
(application one)
HTTP/1.1 200
    <html>Name: Bob</html>
```

Alice requests document 12, which is also a legitimate action and does not trigger a threat detection point or honeytoken.

```
GET /myDocuments?id=12
    Cookie: SID=123456;is_admin=false
```

The application replies with the corresponding data:

```
(application one)
HTTP/1.1 200
    {"december":"1000"}
```

At this point, Alice modifies the admin cookie.

```
GET /myProfile
    Cookie: SID=123456;is_admin=true
```

This is detected by the proxy, which re-routes Alice to the application clone and triggers the extractor. The application clone sends the following reply.

```
(clone of application one)
HTTP/1.1 200
<html>Name: Bob</html>
```

At this point, several things take place. Alice is re-routed to the clone of application one. The extractor associated with application one is notified of Alice's malicious session and retrieves the triggered honeytoken or detection point, as well as the fingerprint, from the session routing. The extractor also actively continues to monitor the logs of the clone of application one for information regarding interactions in the clone that could be used to protect the other applications from this attacker.

Alice continues her system probing, but unknown to her, she is in a session with the application clone of application one.

```
POST /myProfile/upload
Cookie: SID=123456;is_admin=false
[a-picture.png]
```

This POST request is logged in full by the application clone. Here, the upload content is not malicious, but this information can be useful as the attacker may repeat this action (e.g. upload this file to other places). The extractor takes the content of this POST data and defines it as a detection point to its local ledger (for example, as-is or as a hash of the file).

The non-malicious action succeeds as intended by the application code.

```
(clone of application one)
HTTP/1.1 200
```

Alice tries and succeeds to upload a web shell to the server.

```
POST /myProfile/upload
Cookie: SID=123456;is_admin=false
[webshell.php]
```

This POST request is logged in full by the application clone. Here, the upload is malicious, even if without closer inspection it is difficult to determine that it is the case. The extractor takes the content of this POST data and defines it as a detection point to its local ledger (either as-is, or just a hash of the file).

Alice now tries to invoke her malware.

```
POST /webshell.php
Cookie: SID=123456;is_admin=false
[cmd="cat /etc/shadow"]
```

Again, this command is logged in full and is used by the extractor to create a detection point. The server tries to execute the command and returns the critical (albeit fake) data.

```
(clone of application one)
HTTP/1.1 200
<content of /etc/shadow>
```

At this point, Alice thinks she succeeded in her attack and logs out of her session.

```
GET /logout
Cookie: SID=123456;is_admin=false
```

Offline, Alice cracks the content of the (clone)/etc/shadow credentials and tests whether the credentials work.

```
POST /login
username=root&password=Password123
```

Because Alice is still in the clone, this data is visible to the extractor, which proceeds to request a new honeytoken in the form of the found credentials, as it is likely Alice will try to reuse them. Thinking she was successful, Alice logs out in order to stage her next attack against applications two and three.

GET/logout

The extractor is triggered by the proxy when Alice modifies the admin cookie. From that point forward, the extractor can have access to proxy logs. The extractor learns about the triggered honeytoken/threat detection point and about Alice's fingerprint. Depending on the implementation, the Extractor can also have access to the application log. The extractor also can have access to the logs of the application clone. The Extractor reads from the session routing storage about the fingerprint and triggered honeytoken and sends the related data to the ledger, such as in the below description.

```
{
  "from":"application one",
  "date":"20190902170203",
  "honeytoken": {
     "type":"cookie",
     "key":"is_admin",
     "value":"false"
  }
}
```

The "from" field describes the source of information (certain enrichers may ignore the entry of certain sources or treat them differently). The "date" can be used to keep the enrichers up-to-date with which entries they have already processed. Other parameters can also be added, such as a "phase" key specifying when the cookie should be set (always, upon login, upon visiting a certain page), an expiration time, etc.

In the current example, all applications already have in place an "is_admin" honeytoken. If one application did not have it, however, it can, via its enricher, decide to add one to its list of honeytokens, now that the honeytoken has helped capture at least one attacker. Alice's fingerprint is also distributed:

```
{
  "from":"application1",
  "date":"20190902170203",
  "fingerprint": {
     "username":"bob"
     "challenge":"<code to generate the fingerprint>",
     "response":"89wer89023r89"
  }
}
```

For the fingerprint, the content can depend on how it was obtained. In some examples, a fingerprint is determined using JS Fingerprint 2, Web GL, or other approaches. In other examples, the fingerprint can be a multi-factor fingerprint that includes a software information component (e.g., a browser component), a hardware information component (e.g., a number of processors or screen resolution), and a session identifier component (e.g., a session cookie). Each of the respective components can be separately compared against other corresponding components in other fingerprints. A location information component (IP address, time zone, country, etc.) and user information component (e.g., username and/or password) can also be included in a multi-factor fingerprint. Alice's POST of the profile picture will lead to the generation of this entry in the ledger:

```
{
  "from":"application1",
  "date":"20190902170204",
  "detection_point": {
    "type":"request",
    "URL":"POST/myProfile/upload",
    "content_hash":"<sha-256 of a-picture.png>"
  }
}
```

A threat detection point differs from a honeytoken in that there is nothing to deploy on top of the application. Instead, extra monitoring is performed (here of an "HTTP POST" request) at the proxy level. In some examples, the enricher may decide to set a detection point and scan for the presence of a-picture.png when uploaded through the request "POST /myProfile/upload." In other examples, the enricher examines all content, hashes it, and alerts if a match is found, even if the file was not uploaded through the URL "/myProfile/upload" but through other means (such as another upload page located at another URL).

Alice's upload of the web shell to the server yields the following.

```
{
  "from":"application1",
  "date":"20190902170205",
  "detection_point": {
    "type":"request",
    "URL":"POST /myProfile/upload",
    "content_hash":"<sha-256 of webshell.php>"
  }
}
```

Alice's attempt to invoke her malware yields the following.

```
{
  "from":"application1",
  "date":"20190902170204",
  "detection_point": {
    "type":"request",
    "URL":"POST /webshell.php",
    "content_hash":"<sha-256 of string 'cmd="cat/etc/shadow"'>"
  }
}
```

Alice's test of the cracked credentials is a clear case of leaked credentials, and upon review by the extractor, a honeytoken entry is created on the ledger.

```
{
  "from":"application1",
  "date":"20190902170203",
  "honeytoken": {
    "type":"authentication",
    "username":"root",
    "password":"Password123"
  }
}
```

This honeytoken will likely not be present for any application, including application one, as the credentials came from fake data of the clone of application one. The same could happen if an attacker manages to create a new user account on an application clone: the credentials can immediately be identified and added as a honeytoken, helping capture all subsequent connections with similar credentials.

The enricher can read new entries from the ledger and decide whether to deploy the proposed honeytokens/blacklisted fingerprints/threat detection points to its local application or not. One reason NOT to add a certain item could be that there are already too many detection points and that adding another one would degrade performance too much or that the honeytoken type cannot be supported due to a difference in the technology stack.

Continuing specific example 6, Alice has found a zero-day attack (upload of "webshell.php") and root credentials. She sends her report to her accomplices "Chloe" and "Diane." Chloe decides to attack application two by reusing the cracked credentials.

POST/login
username=root&password=Password123

```
POST /login
username=root&password=Password123
```

This is detected by the proxy of application two. Not only are the credentials rejected (as the root user of application two does not have such a password), but Chloe is sent to the clone despite having been completely unknown from the system before and despite not having triggered any of the honeytokens and detection points deployed prior to Alice's attack of application one.

(clone of application two)
HTTP/1.1 403

Diane decides to re-use Alice's attack path directly, meaning that she will not trigger the cookie honeytoken as Alice did as she attacks application three.

```
POST /login
username=bob&password=abc123
```

Bob's credentials work on application three. Diane is authorized by application three, and her fingerprint is requested.

```
(application three)
HTTP/1.1 200
Set-Cookie: SID=345678
Set-Cookie: is_admin=false
<html><script>function compute_fingerprint( )</script></html>
```

Diane returns a fingerprint, which does not correspond to Alice's fingerprint, because their computers are different and have different hardware and/or browser configurations. No malicious activity is detected.

```
POST /api/fingerprint
Cookie: SID=345678;is_admin=false
{"fingerprint":"94pph9f1vhi60g46"}
```

Diane then directly uploads the working webshell to the application.

```
POST /myProfile/upload
Cookie: SID=345678;is_admin=false
[webshell.php]
```

This attack was detected in the clone of application one and propagated to application three which now detects the attack and diverts it successfully. The file upload vulnerability is still present in all three applications, but no data could be stolen by Alice and her team.
(clone of application three)
HTTP/1.1 200

Example Computing Systems

Figure 7:
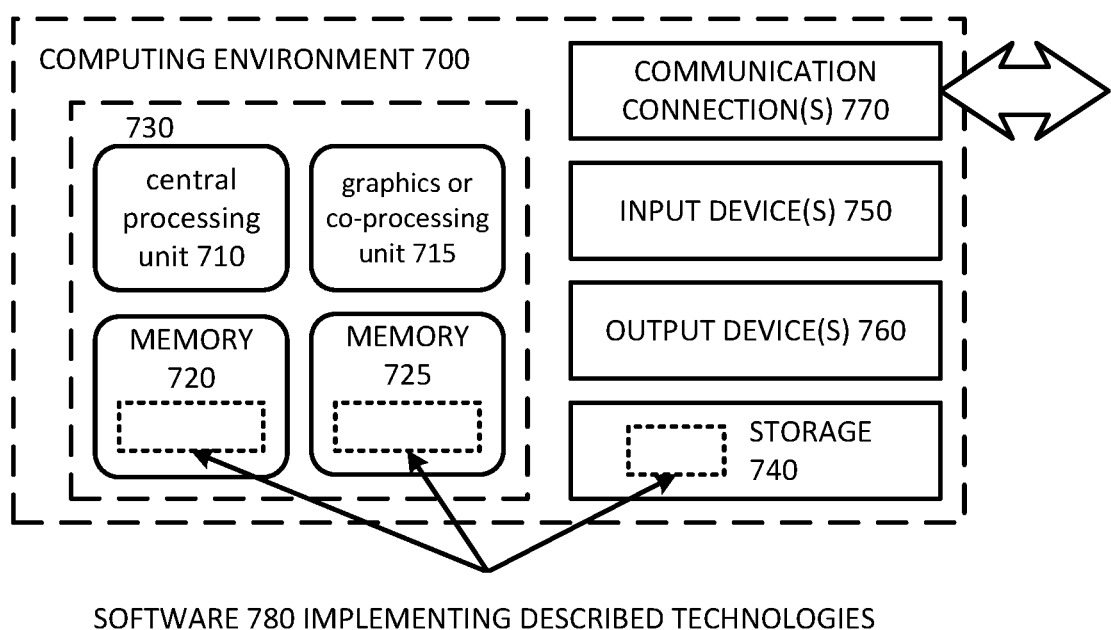
FIG. 7 is a diagram illustrating a generalized implementation environment in which some described examples can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). For example, memory 720 and 725 can store proxy 208, enricher 230, and extractor 226 of FIG. 2 and various components of FIG. 3, including extractors 322, 324, and 326, enrichers 328, 330, and 332, as well as corresponding components in FIG. 4.

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more innovations described herein. For example, storage 740 can store proxy 208, enricher 230, and extractor 226 of FIG. 2 and various components of FIG. 3, including extractors 322, 324, and 326, enrichers 328, 330, and 332, as well as corresponding components in FIG. 4.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java®, Perl®, JavaScript®, AdobeFlash®, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method of collaboratively securing applications, comprising:
    based on one or more user interactions with a first application during a session with the first application, determining that the session is malicious; and
    responsive to determining that the session is malicious:
        limiting access to data associated with the first application,
        providing session data for the malicious session with the first application for use in threat detection by a second application, and
        based on the session data for the malicious session with the first application, creating a honeytoken for the second application, wherein the honeytoken is an aspect added to the second application based on the session data for the malicious session with the first application that, when interacted with, indicates a malicious session, or classifying an existing aspect of the second application as a threat detection point, wherein interaction with the threat detection point indicates a malicious session, wherein the first and second applications are different applications having different functionality.

2. The method of claim 1, wherein limiting access to data associated with the first application comprises:
    establishing a cloned application session including alternative data in place of data associated with the malicious session; and
    transferring the malicious session to the cloned application session.

3. The method of claim 1, wherein the session data for the malicious session comprises at least one of credentials used to establish the malicious session or a digital fingerprint reflecting characteristics of the malicious session.

4. The method of claim 3, further comprising for the first and second applications, blacklisting the credentials or the digital fingerprint such that future session requests for the first or second applications that match the credentials or the digital fingerprint are denied or are established as cloned application sessions in which data associated with the first or second applications is replaced with alternative data.

5. The method of claim 1, wherein the session data for the malicious session comprises an indication of the one or more user interactions with the first application.

6. The method of claim 1, wherein providing session data for the malicious session comprises adding the session data to a shared threat data store accessible to the first and second applications.

7. The method of claim 6, wherein the first and second applications are part of a group of related applications that provide threat detection information to the shared threat data store.

8. The method of claim 1, further comprising based on the session data for the malicious session, pushing a threat update to the second application.

9. The method of claim 1, further comprising receiving, at the first application, a threat update based on user interaction with the second application.

10. A system, comprising:
a processor; and
one or more computer-readable storage media storing computer-readable instructions that, when executed by the processor, perform operations comprising:
at a first application, receiving a threat update reflecting activity in a malicious session with a second application, wherein the first and second applications are different applications having different functionality;
based on the threat update, (i) creating a honeytoken for the first application, wherein the honeytoken is an aspect added to the first application based on the threat update that, when interacted with, indicates a malicious session or (ii) classifying an existing aspect of the first application as a threat detection point, wherein interaction with the threat detection point indicates a malicious session;
and
upon determining that a threat detection point or honeytoken created based on the threat update has been triggered during a session with the first application, determining that the session with the first application is malicious and limiting access to data associated with the first application.

11. The system of claim 10, wherein limiting access to data associated with the first application comprises:
establishing a cloned application session including alternative data in place of data associated with the first application; and
transferring the session with the first application to the cloned application session.

12. The system of claim 10, wherein a shared threat data store receives session data for the malicious session with the second application and provides the threat update to the first application.

13. The system of claim 10, wherein the first and second applications access local threat data stores local to the first and second applications that are updated when new malicious sessions are identified.

14. The system of claim 10, wherein the first and second applications are part of a group of applications that share session information for sessions determined to be malicious.

15. One or more computer-readable storage media storing computer-executable instructions for collaboratively securing applications, the securing comprising:
based on one or more user interactions with a first application during a session with the first application, determining that the session is malicious;
transferring the session with the first application to a first cloned application session, the first cloned application session including alternative data in place of data associated with the session with the first application;
based on session data for the malicious session, providing a threat update to a plurality of other applications, wherein the respective other applications are different applications having different functionality;
for the respective other applications, (i) creating a honeytoken, wherein a honeytoken is an aspect added to the application based on the threat update that, when interacted with, indicates a malicious session or (ii) classifying an existing aspect of the application as a threat detection point, wherein interaction with the threat detection point indicates a malicious session;
upon determining that one of the threat detection points or honeytokens based on the threat update has been triggered during a session with one of the other applications, determining that the session with the one of the other applications is malicious; and
transferring the session with the one of the other applications to a second cloned application session.

16. The one or more computer-readable storage media of claim 15, wherein securing further comprises:
capturing user interactions with the first cloned application session; and
providing a second threat update to the plurality of other applications reflecting the user interactions with the first cloned application session.

17. The one or more computer-readable storage media of claim 15, wherein securing further comprises for the respective other applications, blacklisting at least one of a digital fingerprint for the malicious session with the first application or credentials used to establish the malicious session with the first application such that future session requests for the other applications that match the blacklisted credentials or digital fingerprint are denied or are established as cloned application sessions.

18. The one or more computer-readable storage media of claim 15, wherein a shared threat data store receives session data for the malicious session with the first application and provides the threat update to the plurality of other applications.

19. The one or more computer-readable storage media of claim 15, wherein the first application and the respective other applications maintain local threat data stores local to the first application and the respective other applications that are updated with session data when new malicious sessions are identified.

* * * * *